(No Model.)
S. D. STROHM.
ELECTRICAL CABLE.
No. 289,164. Patented Nov. 27, 1883.
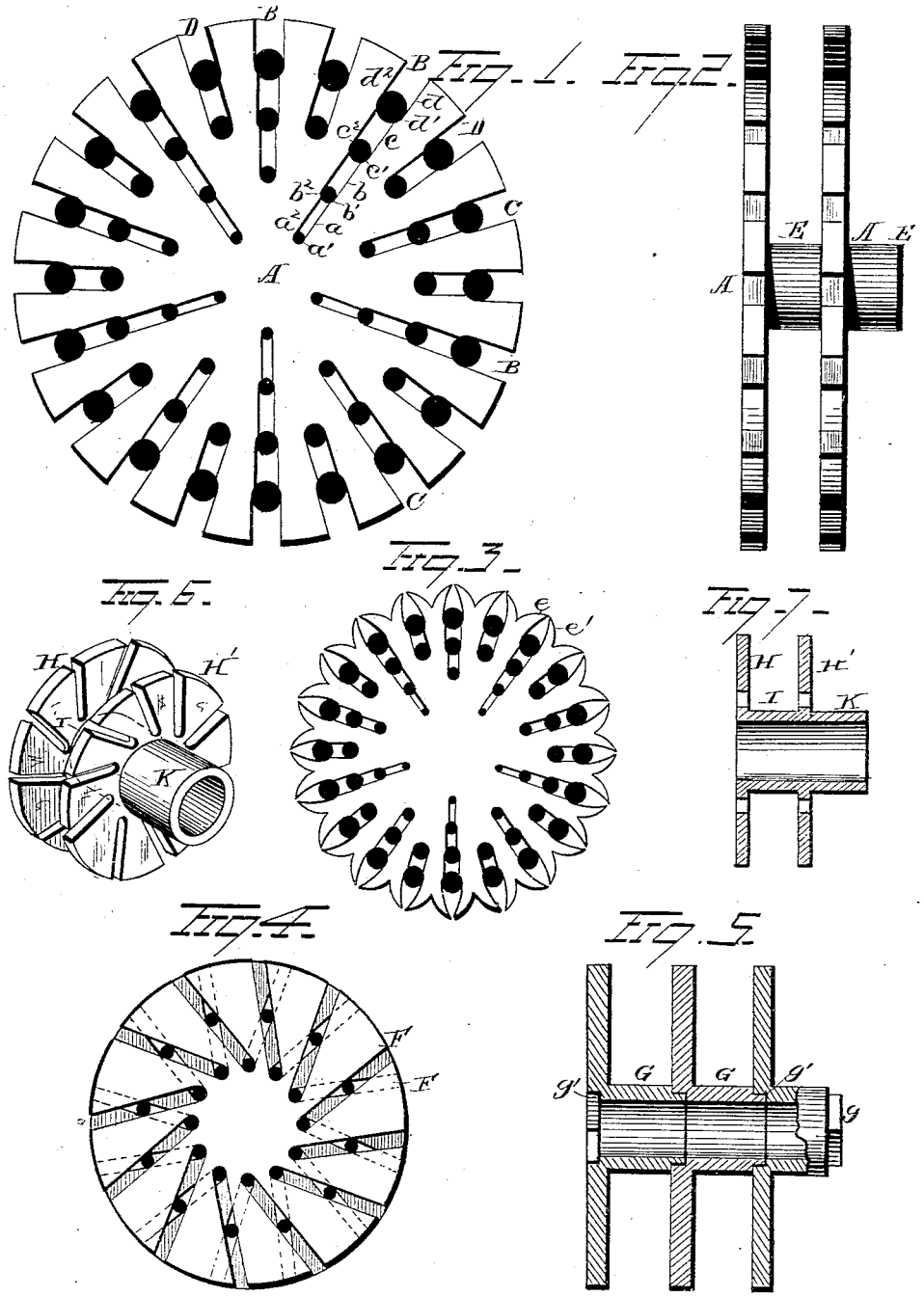

UNITED STATES PATENT OFFICE.

SAMUEL D. STROHM, OF PHILADELPHIA, PENNSYLVANIA.

ELECTRICAL CABLE.

SPECIFICATION forming part of Letters Patent No. 289,164, dated November 27, 1883.

Application filed September 16, 1881. Renewed April 19, 1883. (No model.)

*To all whom it may concern:*

Be it known that I, SAMUEL D. STROHM, of Philadelphia, in the county of Philadelphia and State of Pennsylvania, have invented certain new and useful Improvements in Electric Cables; and I do hereby declare the following to be a full, clear, and exact description of the invention, such as will enable others skilled in the art to which it pertains to make and use the same.

My invention relates to an improvement in electric conductors, the object being to provide an electric conductor of such construction that any desired number of wires may be readily secured in close proximity to each other and yet be perfectly insulated from one another.

With these ends in view my invention consists in an electric conductor consisting of a number of wires and disks, each having its periphery provided with a number of open slots, each slot being formed to receive two or more wires, and so constructed that the entire number of wires may be inserted from the outside of the disks and be retained against contact with each other.

My invention further consists in certain other features of construction and combinations of parts, as will hereinafter be described, and pointed out in the claims.

In the accompanying drawings, Figure 1 is a transverse section of an electric conductor embodying my invention. Figs. 2, 3, 4, 5, 6, and 7 are modifications.

A represents a disk of porcelain, glass, or other non-conducting material, or metal or other material coated with any suitable non-conducting substance. Disk A is provided with three sets of open slots.

B represent the slots of the greatest depth, C slots of slightly less depth, and D slots of the least depth. As will be observed on reference to the drawings each one of the slots is graduated in width. The deep slots B are subdivided into four sections, the section $a$, nearest the center of the disk, being the narrowest, and terminating in a circular bearing, $a'$, for the reception of the small wires $a^2$. The next outer section, $b$, is of slightly greater width, and terminates in a wire-receptacle, $b'$, within which is inserted the wire $b^2$. The next outer section, $c$, is wider still, and is provided with a wire-receptacle, $c'$, in which is placed the wire $c^2$. The outer and widest section, $d$, terminates in a wire-receptacle, $d'$, in which is placed the largest wire, $d^2$. The other series of slots, C D, are constructed on the same plan as that described.

In laying the conductor the smallest wires or conductors are first inserted, then the next larger size of wires, and so on until all the wires are in place. The wires may be retained against displacement by means of any suitable non-conducting material inserted within the slots between the adjacent wires. The disks may be flat, or may be provided with spacing-hubs E, as illustrated in Fig. 2. Instead of forming the slots in the manner described, they may be made as of the form illustrated in Fig. 3, provided the disks are made of metal, and the wires retained in place by bending the prongs $e$ $e'$, forming the side walls of the slots.

I do not restrict myself to any particular number or arrangement of the open slots, the drawings simply showing one form of the many that might be used.

In Fig. 4 I have represented the disks provided with tangential slots F and the disks arranged in reverse order, whereby the wires are prevented from accidental displacement. Fig. 5 shows the disks provided with spacing-hubs G, the latter being provided with square or angular ends $g$ at one end, which are received in corresponding recesses, $g'$, in their opposite ends, whereby the disks are prevented from rotation.

Fig. 6 is a view in perspective, and Fig. 7 is a view in longitudinal section, of another construction embodying my invention. In this instance two disks, H H', are formed integral with a central core or cylinder, I, which projects beyond one of the disks and forms a hub, K. Each disk is provided with tangential slots leading in opposite directions, as illustrated in Fig. 6, to prevent the accidental displacement of the wires when once in place.

A cable constructed as described may be quickly laid, as all the wires are inserted from the outside of the disks into the open slots therein, and a great number of wires may be thus arranged in small compass without interfering with one another. Should any of the wires need removal for repairs, it can be readily accomplished by simply withdrawing the wire from its slot. The cable may be embedded in any insulating compound or material, or be inserted in a pipe or trough constructed for its reception.

It is evident that slight changes might be made in the form and arrangement of parts without involving a departure from my invention, and hence I would have it understood that I do not restrict myself to the exact form and construction of parts shown and described.

I make no claim in this patent to an electric cable consisting of a series of wires and separate and independent insulated disks, rings, or supports provided with open slots in their outer or inner peripheries for the reception of the wires, and separate disks, rings, or supports constructed and adapted to engage with the series of wires and prevent their displacement from said slots. Neither do I claim in this patent an electric conductor consisting of two or more series of wires, one series being encircled by another series, and rings or disks provided with open slots for the reception of the wires, the rings, disks or supports of the outer series or set of wires being constructed to engage with the wires of the next inner series and prevent their displacement from the slots, as such subject-matter is shown, described, and claimed in my patent the application for which was filed September 16, 1881.

Having fully described my invention, what I claim as new, and desire to secure by Letters Patent, is—

1. An electric cable consisting of a number of wires and supporting-disks, each disk provided with a number of open slots, and each slot constructed and adapted to retain two or more wires out of contact with each other, substantially as set forth.

2. An electric conductor consisting of a number of wires and supporting-disks, each disk provided with a number of open slots graduated in width for the reception of wires of different sizes, substantially as set forth.

In testimony whereof I have signed this specification in the presence of two subscribing witnesses.

SAMUEL D. STROHM.

Witnesses:
HERMAN MORAN,
C. S. DRURY.